(12) United States Patent
Zastera et al.

(10) Patent No.: US 9,839,870 B2
(45) Date of Patent: Dec. 12, 2017

(54) FILTER FOR HUMIDITY CONTROL, TYPICALLY FOR CONTROL OF HUMIDITY IN A BULK LIQUID TANK

(71) Applicant: DONALDSON COMPANY, INC., Minneapolis, MN (US)

(72) Inventors: Dustin Zastera, Hastings, MN (US); Gregory L. Lavallee, Monticello, MN (US); Marty A. Barris, Lakeville, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 15/293,442

(22) Filed: Oct. 14, 2016

(65) Prior Publication Data
US 2017/0028342 A1 Feb. 2, 2017

Related U.S. Application Data

(62) Division of application No. 14/382,910, filed as application No. PCT/US2013/029138 on Mar. 3, 2013, now abandoned.
(Continued)

(51) Int. Cl.
*B01D 53/02* (2006.01)
*B01D 53/04* (2006.01)
(Continued)

(52) U.S. Cl.
CPC ..... *B01D 53/0446* (2013.01); *B01D 53/0415* (2013.01); *B01D 53/261* (2013.01);
(Continued)

(58) Field of Classification Search
CPC ........ B01D 2253/102; B01D 2253/106; B01D 2253/108; B01D 2253/302;
(Continued)

(56) References Cited

U.S. PATENT DOCUMENTS 2,994,404 A 8/1961 Schifferly
4,717,401 A 1/1988 Lupoli et al.
(Continued)

FOREIGN PATENT DOCUMENTS

DE 103 13 575 9/2004
EP 0 870 538 10/1998

OTHER PUBLICATIONS

International Search Report for International Application No. PCT/US2013/029138 dated Oct. 1, 2014 (5 pages).
(Continued)

*Primary Examiner* — Christopher P Jones
(74) *Attorney, Agent, or Firm* — Merchant & Gould P.C.

(57) ABSTRACT

A filter is includes a housing and at least first and second adsorbent materials within the housing. The second adsorbent material has different characteristic from the first adsorbent material and is in series with the first adsorbent material. When assembled, a labyrinth arrangement is located between a first port in the housing and the first adsorbent material such that gas travels between the first port and the first adsorbent material by passing through the labyrinth arrangement. A filtration system and methods for humidity control of a liquid tank head space uses a filter, including first and second adsorbent and a diffusion channel or labyrinth arrangement.

15 Claims, 10 Drawing Sheets

Related U.S. Application Data

(60) Provisional application No. 61/607,234, filed on Mar. 6, 2012.

(51) Int. Cl.
| | |
|---|---|
| *B01D 53/26* | (2006.01) |
| *F02M 25/08* | (2006.01) |
| *B01J 20/04* | (2006.01) |
| *B01J 20/18* | (2006.01) |
| *B01J 20/20* | (2006.01) |
| *B01J 20/10* | (2006.01) |
| *B01J 20/28* | (2006.01) |
| *B60K 15/035* | (2006.01) |
| *B60K 15/03* | (2006.01) |

(52) U.S. Cl.
CPC ........... *B01J 20/045* (2013.01); *B01J 20/103* (2013.01); *B01J 20/18* (2013.01); *B01J 20/20* (2013.01); *B01J 20/28052* (2013.01); *F02M 25/0854* (2013.01); *B01D 2253/102* (2013.01); *B01D 2253/106* (2013.01); *B01D 2253/108* (2013.01); *B01D 2253/302* (2013.01); *B01D 2257/702* (2013.01); *B01D 2257/80* (2013.01); *B01D 2259/402* (2013.01); *B01D 2259/4145* (2013.01); *B01D 2259/4516* (2013.01); *B01J 2220/42* (2013.01); *B60K 2015/03236* (2013.01); *B60K 2015/03514* (2013.01)

(58) Field of Classification Search
CPC .......... B01D 2257/702; B01D 2257/80; B01D 2259/402; B01D 2259/4145; B01D 2259/4516; B01D 53/0415; B01D 53/0446; B01D 53/261; B01J 20/045; B01J 20/103; B01J 20/18; B01J 20/20; B01J 20/28052; B01J 2220/42; B60K 2015/03236; B60K 2015/03514; F02M 25/0854

See application file for complete search history.

(56) References Cited

U.S. PATENT DOCUMENTS

| | | |
|---|---|---|
| 5,538,542 A | 7/1996 | Watanabe et al. |
| 5,743,943 A | 4/1998 | Maeda et al. |
| 5,814,129 A * | 9/1998 | Tentarelli ........... B01D 53/0431 210/266 |
| 5,912,368 A | 6/1999 | Satarino et al. |
| 2003/0056653 A1 | 3/2003 | Ueki et al. |
| 2005/0139068 A1 | 6/2005 | Kim et al. |
| 2005/0139077 A1* | 6/2005 | Garikipati .......... B01D 53/0415 96/130 |
| 2005/0139078 A1 | 6/2005 | Tuma et al. |
| 2010/0024476 A1 | 2/2010 | Shah |
| 2014/0326134 A1 | 11/2014 | Frankel |

OTHER PUBLICATIONS

International Written Opinion for International Application No. PCT/US2013/029138 dated Oct. 1, 2014 (11 pages).

* cited by examiner

FILTER FOR HUMIDITY CONTROL, TYPICALLY FOR CONTROL OF HUMIDITY IN A BULK LIQUID TANK

CROSS-REFERENCE TO RELATED APPLICATIONS

This application is a divisional of U.S. application Ser. No. 14/382,910, filed Sep. 4, 2014, which is a US National Stage of PCT International patent application No. PCT/US2013/029138, filed Mar. 5, 2013, and claims priority to U.S. Provisional Application Ser. No. 61/607,234, filed Mar. 6, 2012, and which applications are incorporated herein by reference. To the extent appropriate, a claim of priority is made to each of the above disclosed applications.

TECHNICAL FIELD

This disclosure relates to a breather, referred to herein as a "breather filter" for controlling the humidity of the air that needs to be exchanged between the environment and the head space inside of a fluid container for a moisture sensitive application, such as a fluid tank, a hydraulic liquid tank, a liquid fuel tank, or an electronic device container. In particular, this disclosure concerns a breather filter having one or more adsorbents to improve adsorbent performance and/or including a diffusion channel to slow or eliminate saturation of the adsorbent during no-flow conditions.

BACKGROUND

Breather filters enable the ingression and egression of gas into reservoirs of oils, hydraulic fluids, and fuels when the fluid level of the reservoir changes. It is desirable to remove moisture from the air that is being drawn into the reservoir, such that the oil or hydraulic fluid is protected from moisture. During egression of the gas from the reservoir, it is desirable to filter that air from contaminants so that the ambient air surrounding the reservoir is not polluted.

Prior systems have used breather filters having a single adsorbent bed, which become quickly saturated with water when exposed to humid environments, even with no flow. Improvements are desirable.

SUMMARY

In one aspect, a breather filter, is provided which includes a housing and at least first and second adsorbent materials within the housing. In this disclosure, the terms "breather filter" and "filter" are used. In some applications the breather filter or filter is configured to remove solid particles in addition to removing moisture. In other applications, the breather filter or filter is not configured to remove solid particles. The second adsorbent material is different in at least one respect from the first adsorbent material and is typically in series with the first adsorbent material. A labyrinth arrangement is in the housing and is located between a first port in the housing and the first adsorbent material such that gas travels between the first port and the first adsorbent material by passing through the labyrinth arrangement.

In another aspect, a filtration system for humidity control of a liquid tank head space is provided. The system includes a fluid tank configured to hold a liquid, such as an oil or hydraulic fluid therein, and a head space between the liquid and a wall of the tank. A filter, as characterized above, is in fluid communication with the head space of the tank. When the liquid in the fluid tank drops, air is drawn into the breather filter through the labyrinth arrangement, the first adsorbent material, the second adsorbent material, and then out of the breather filter into the head space of the fluid tank. When liquid in the tank rises, air is forced from the head space, into the filter, through the second adsorbent material, then the first adsorbent material, then the labyrinth arrangement, and then exits the filter to the atmosphere.

In another aspect, a method for controlling humidity of a tank head space, for example, a liquid tank head space is provided. The method includes providing a fluid tank having a liquid therein and a head space between the liquid and a wall of the tank, and a filter in fluid communication with the head space of the tank. When liquid in the fluid tank drops, there is a step of drawing gas into the filter from the atmosphere and through a labyrinth arrangement, then through one or more adsorbent materials in series, and then from the breather filter and into the head space of the fluid tank. When liquid in the tank rises, there is a step of directing gas from the head space and into the breather filter, through the one or more adsorbent materials in series (in the reverse direction), then through the labyrinth arrangement, and then out of the breather filter to the atmosphere.

One embodiment disclosed herein includes a filter for use with a fluid container. The filter includes a housing having a first port and a second port; at least a first adsorbent material within the housing; and at least a second adsorbent material within the housing layered in series with the first adsorbent material. The second adsorbent material typically has a characteristic different from the first adsorbent material. The first adsorbent material and the second adsorbent material is arranged within the housing so that gas travels between the first port and second port by passing through each of the first adsorbent material and the second adsorbent material.

The above-noted second adsorbent material characteristic typically is at least one of particle size, adsorbent capacity, and/or specific surface area.

In one example of the above-noted embodiment, the first adsorbent material adsorbs a greater amount of moisture at a higher relative humidity than the second adsorbent material.

In another example of the above-noted embodiment, the second adsorbent material changes in color in response to a predetermined level of adsorption.

In another example of the above-noted embodiment, the first adsorbent material comprises a layer of activated carbon or a blend thereof. The second adsorbent material comprises a layer of silica gel or a blend thereof including calcium sulfate and zeolites.

In preferred embodiments, the labyrinth arrangement acts as a buffer between the adsorbent material(s) and the environment around the breather filter. In other words, the adsorbent inside the breather filter is not directly exposed to the environment at large. Instead, air traveling to the adsorbent travels through the labyrinth and air traveling from the adsorbent travels through the labyrinth. Thus, when the flow of air traveling from the adsorbent stops, the adsorbent remains in contact with a relatively static volume of air that typically contains less moisture than the air in the general environment around the breather filter. By keeping the adsorbent in contact with the relatively dry volume, the overall moisture load on the adsorbent decreases, and the life of the adsorbent increases.

In existing breather filters, if the breather filter and tank is located in a humid environment, the breather filter can still be exposed to moisture from the atmosphere even if the filter is not breathing. By diffusion alone, the adsorbent can be exposed to the humid external air conditions. In such conditions, the adsorbent material can quickly reach its capacity of adsorption, even though the equipment that is drawing on fluid in the tank is not being used.

To address this situation, it was recognized that by having a breather filter that includes a diffusion channel between the atmosphere and the adsorbent material, any moist air that is drawn in during no-flow conditions, will need to first travel through the diffusion channel before reaching the adsorbent material. The diffusion channel introduces a labyrinth or a tortuous path, which serves to restrict and dissipate to preclude entry of moisture and other contaminants into the adsorbent material. This is preferably accomplished without unreasonably pressurizing the reservoir, nor placing it under a substantial vacuum.

Additionally, by using a plurality of specialized adsorbents (adsorbents with different adsorbing abilities) in combination with the labyrinth or by themselves, it is possible to extend the life and performance of a breather filter. For example, it is possible to provide a synergistic effect by providing adsorbents in series with each other, an outermost adsorbent having a first adsorbing ability, and a next outermost adsorbent having a second adsorbing ability, and so on. Typically, the outermost adsorbent material is chosen for optimized performance at high humidity while the next outermost adsorbent is chosen for optimized performance at relatively lower humidity. Thus, the adsorbents work in concert to progressively dry the air entering the breather.

It is noted that not all of the specific features described herein need to be incorporated in an arrangement for the arrangement to have some selected advantage according to the present disclosure.

DETAILED DESCRIPTION

Figure 1:
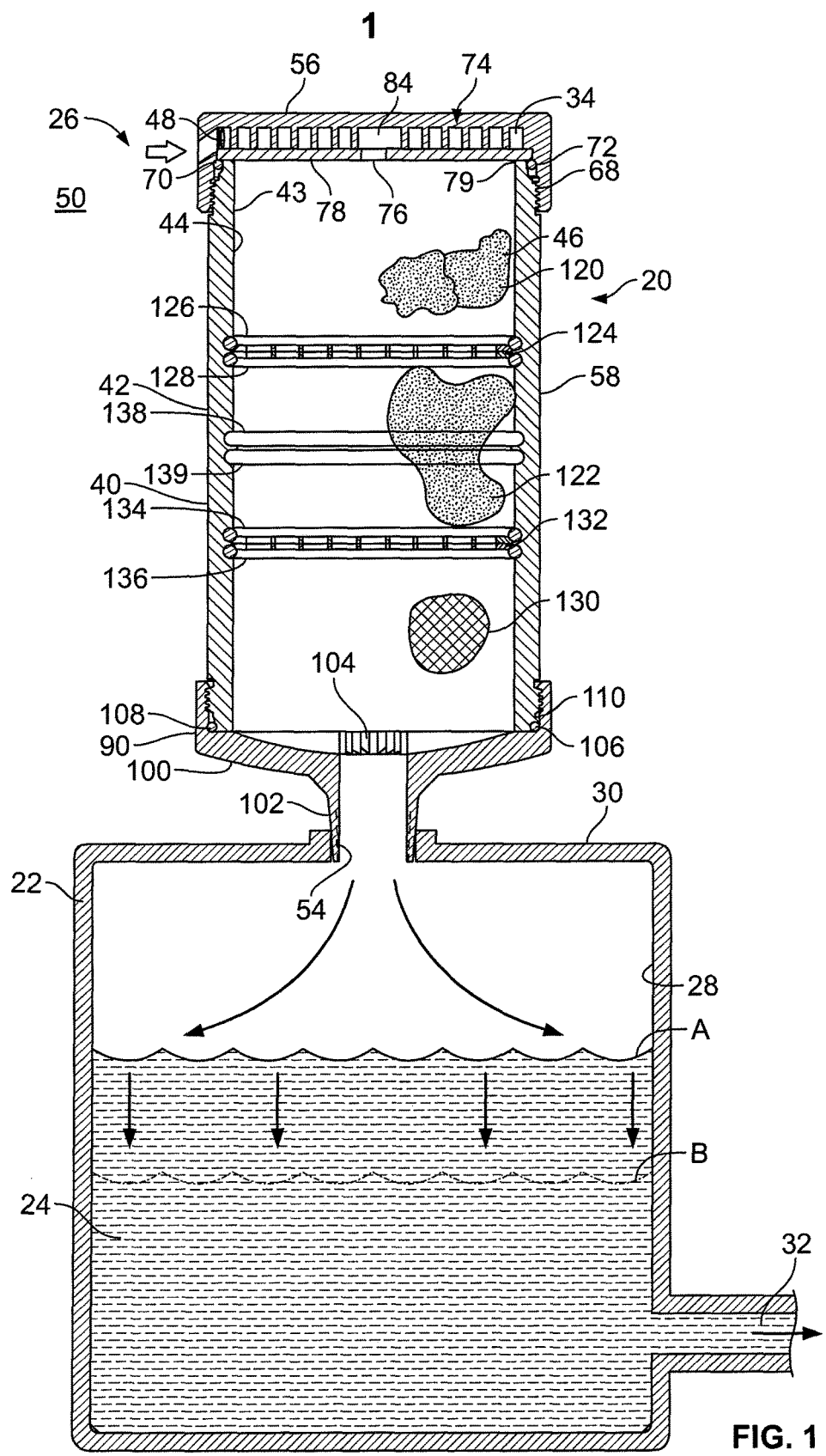
FIG. 1 is a schematic, cross-sectional view of a breather filter constructed in accordance with principles of this disclosure mounted on a fluid tank and illustrating airflow when the fluid level in the tank is dropping.
Figure 2:
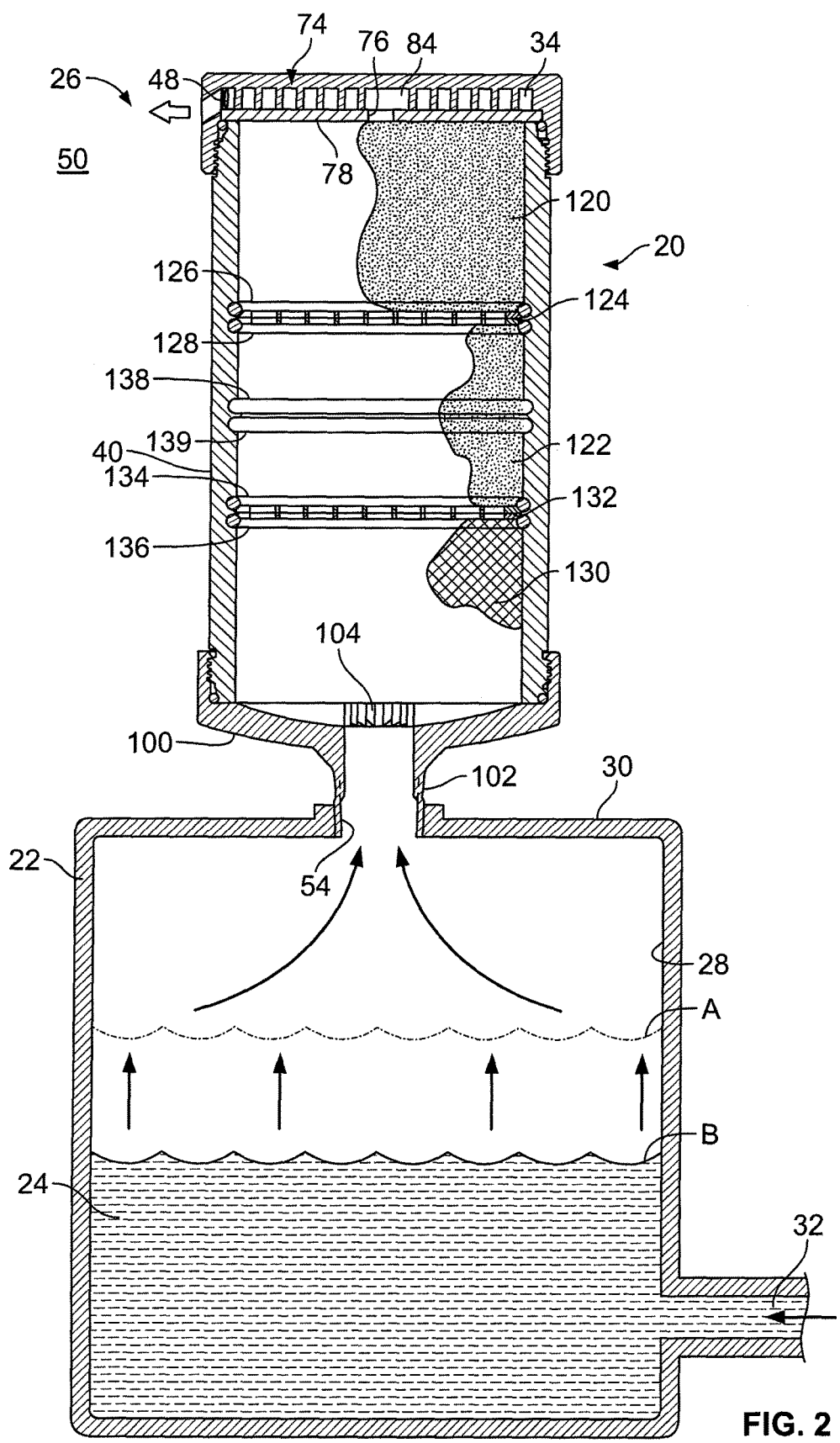
FIG. 2 is a schematic cross-sectional view of the breather filter and tank of FIG. 1 illustrating airflow when the fluid level in the tank is rising.
Figure 3:
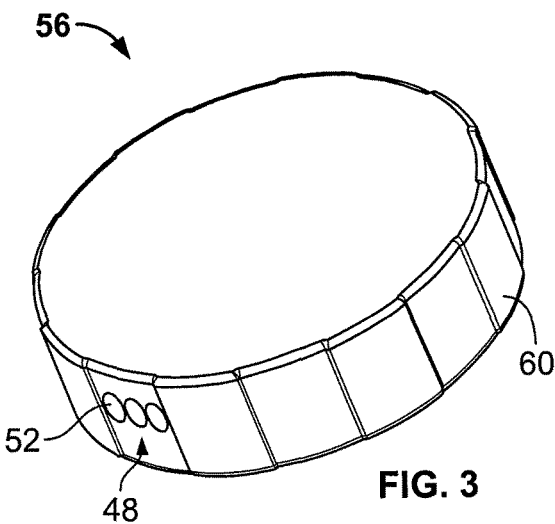
FIG. 3 is a top, perspective view of an end cap of a housing of the breather filter of FIGS. 1 and 2.
Figure 4:
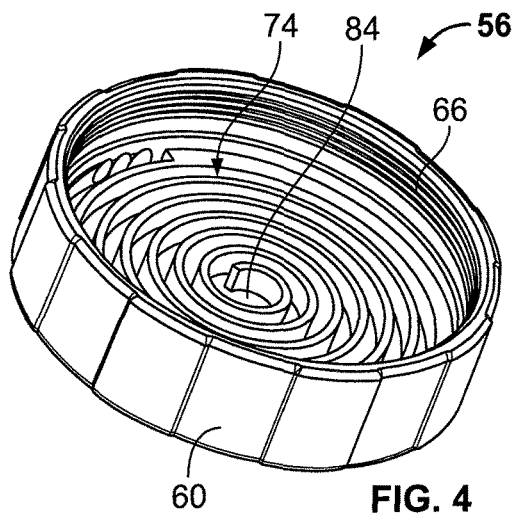
FIG. 4 is a bottom perspective view of the end cap of FIG. 3.
Figure 5:
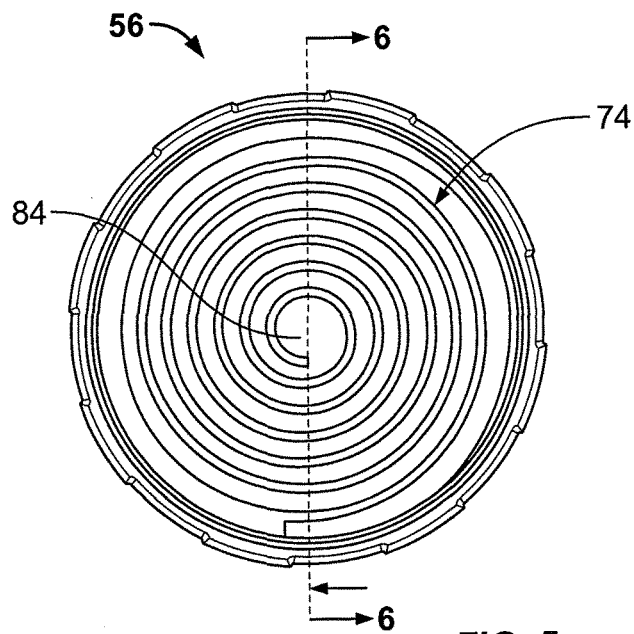
FIG. 5 is a top view of the end cap of FIG. 4.
Figure 6:
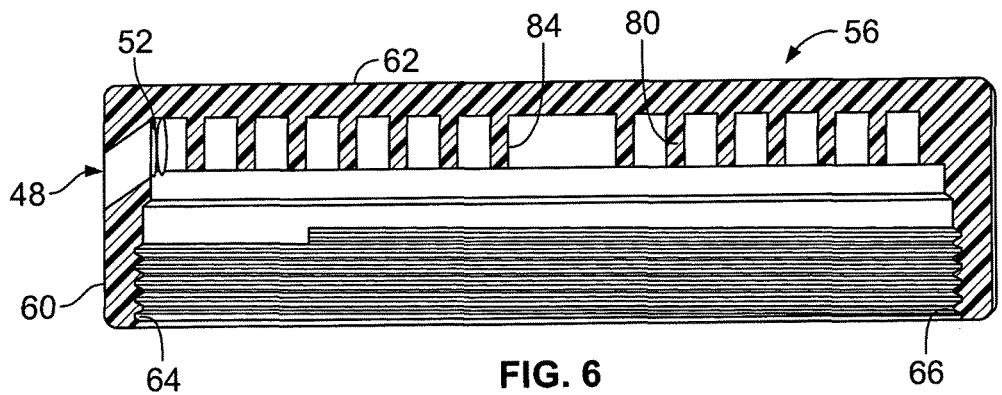
FIG. 6 is a cross-sectional view of the end cap of FIGS. 3-5, the cross-section being taken along the line 6-6 of FIG. 5.
Figure 7:
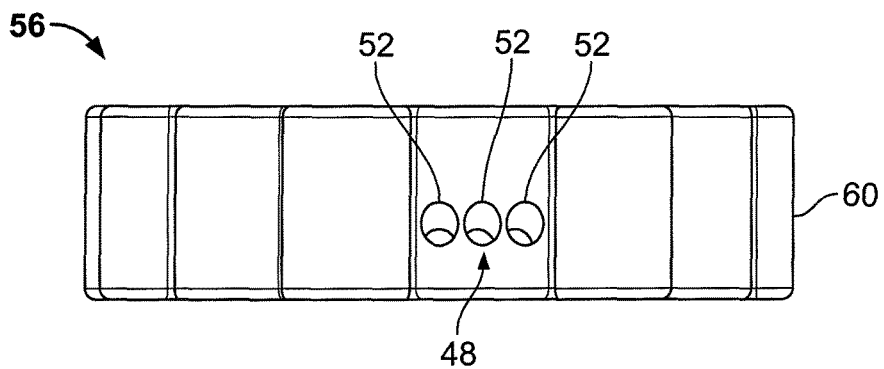
FIG. 7 is an end view of the end cap of FIGS. 3-5.
Figure 8:
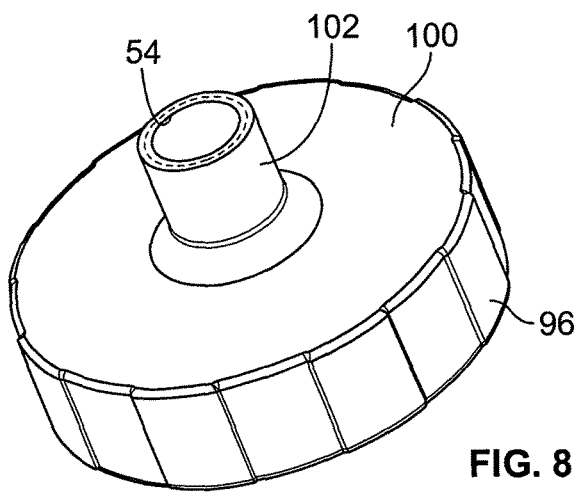
FIG. 8 is a perspective view of a bottom end cap of the housing of the breather filter of FIGS. 1 and 2.

Overview of Operation, FIGS. 1 and 2

An overview of the operation of one example filter is described in reference to FIGS. 1 and 2. In FIGS. 1 and 2, one example embodiment of a filter constructed in accordance with principles of this disclosure is shown at 20. The filter 20, shown herein as a breather filter 20, is typically removably attachable to a moisture sensitive container 22, such as a fluid tank 22, holding a reservoir of liquid or fluid 24. The fluid 24 can be liquid such as hydraulic fluid, oil, fuel, etc, which is intended to be protected from exposure moisture. Together, the breather filter 20 and tank 22 form a filtration system 26 used for humidity control of the head space 28 between the fluid 24 and a wall 30 of the tank 22.

The tank 22 generally functions as a storage tank for the fluid 24, such as hydraulic fluid or oil, that is used with hydraulic equipment (not shown) connected to the tank 22 by way of a fluid port 32. As the hydraulic equipment operates, the fluid level in the tank 22 rises and falls as the fluid 24 enters and exits the tank 22 by way of the port 32. The head space 28 contained between the fluid 24 and the wall 30 varies in volume as the level of the fluid 24 fluctuates.

In operation, as the fluid level falls from level A to level B as shown in FIG. 1, the head space 28 expands, drawing in a gas, such as ambient air, from the atmosphere, through a port 48, through breather filter 20, and then into the tank 22. The breather filter 20 removes moisture and particulate from the incoming air.

In FIG. 2, when the fluid level rises from level B to level A, as shown in FIG. 2, the head space 28 contracts. This contraction forces effluent gas or air out of the tank 22 and through the breather filter 20, and through port 48 ultimately out into the atmosphere. In some cases, the effluent gas can include mist formed from the fluid 24, thus enabling a portion of the fluid 24 to escape from the tank 22. In some embodiments, the breather filter 20 can remove fluid mist from the effluent gas, and in preferred arrangements, the fluid drains back into the tank 22 from the breather filter 20.

When the system 26 is in a static state, and the hydraulic equipment is not operating causing the level of fluid 24 in the tank 22 to change, if the atmosphere is of a higher pressure than the pressure in the head space 28 of the tank, such as in high humid conditions in the atmosphere, ambient air may still be drawn into the breather filter 20 even though the hydraulic equipment is not operating. Diffusion may also be an issue. The air drawn in or entering via diffusion will typically first travel through a diffusion channel 34 in the breather filter 20. This diffusion channel will help to prevent the moist ambient air from reaching the adsorbent materials within the breather filter 20, thereby lengthening the life of the breather filter 20.

Example Embodiment of Breather Filter, FIGS. 1-14

In reference first to FIGS. 1 and 2, the breather filter 20 includes a housing 40. The housing 40 includes an outer surrounding wall 42 defining an interior volume 44. The interior volume 44 is for holding at least one, and preferably a plurality of adsorbent materials 46 therewithin. Such adsorbent materials include, for example, activated carbon or zeolite. These materials may be arranged in series, in any order. In at least one embodiment, however, the selected order is for a material that has a higher adsorptive capacity at relatively high humidity to be located closer to the first port than is another material with adsorptive capacity that is greater at relative low humidity.

The housing 40 includes a first port 48 constructed and arranged to be in communication with the atmosphere 50. The first port 48 can be any arrangement that allows for gas flow or airflow communication between the atmosphere 50 and the internal volume 44 of the housing 40. (As used herein, the terms "air flow" and "air" are intended to encompass "gas flow" and "gas", and these terms are used interchangeably throughout and are intended to mean the same thing.) In the embodiment shown in FIGS. 3 and 7, the first port 48 includes at least one, and as shown, three apertures 52 penetrating the wall 42 of the housing 40.

The housing 40 further includes a second port 54. The second port 54 is constructed and arranged to be in communication with the tank 22. In particular, the second port 54 is in airflow of fluid communication with the head space 28 of the tank 22. In the embodiment illustrated, the first port 48 and the second port 54 are at opposite ends of the housing 40. In other arrangements, the location of the ports relative to each other in the housing could be different. Each of the first port 48 and the second port 54 allows for fluid flow both into the housing 40 as well as out of the housing 40, depending on which direction the breather filter 20 is breathing; that is, whether the breather filter 20 is allowing for ingress or egress of gas relative to the tank 22.

While a variety of constructions for the housing 40 of the breather filter 20 are possible, in this particular embodiment, the housing includes a first end cap 56. The first end cap 56 is removably attachable to housing body 58. The housing body 58 is defined by the outer wall 42. The first end cap 56 includes an outer surrounding wall 60 and an end wall 62. Along an inner surface 64 of the wall 60 are threads 66 used for removable attachment with a suitably threaded portion 68 along the outer wall 42 of the housing body 58. While the connection between the first end cap 56 and the housing body 58 is shown as threaded, other ways of attaching these two pieces could be used, such as with a fastener, clamp, interference fit, adhesive, or bracket. In addition, rather than having internal threads on the first end cap 56 and external threads on the housing body 58, the reverse could be used as well.

In this embodiment, the first end cap 56 defines the first port 48.

In the embodiment shown, between the first end cap 56 and the housing body 58 is a seal member 70. The seal member 70 is for forming a seal between the first end cap 56 and the housing body 58 so that any air or fluid that enters or exits the interior volume 44 of the housing 40 must pass through the first port 48 of the first end cap 56. In the embodiment shown, the seal member 70 is an O-ring 72.

As mentioned previously, the breather filter 20 includes diffusion channel 34. In this embodiment, the diffusion channel 34 includes a labyrinth arrangement 74 in the housing 40 and in airflow communication with the first port 48. By the term "labyrinth arrangement", it is meant structure in the housing 40 that forms a deliberately meandering airflow path that is non-linear (as a whole) and is maze-like. In preferred arrangements, the labyrinth arrangement includes a long path length in a relatively small space. The labyrinth arrangement 74 can be a winding airflow path between the first port 48 and a labyrinth aperture 76 providing communication between the labyrinth arrangement 74 and the interior volume 44 of the housing 40. In the embodiment shown in FIGS. 1 and 2, there is a plate 78 between and against the first end cap 56 and the upper opening 79 formed by the outer wall 42 of the housing body 58. The plate 78 defines the labyrinth aperture 76, and in this embodiment, the labyrinth aperture 76 is a single, circular aperture centered within the plate 78. In other arrangements, the labyrinth aperture 76 can be a plurality of apertures in different locations and with different geometries. Some of these different geometries include rectangular, rhombus, or square-shaped, pie-wedge shaped, triangular, regular or irregular polygon-shaped, as well as 3-dimensional.

In the embodiment depicted in FIG. 1, the plate 78 is located on the housing 40, and the majority of the labyrinth arrangement 74 is located on the first endcap 56 (with the plate 78 forming one wall of the labyrinth arrangement 74. However, in some embodiments, the entire labyrinth arrangement 74 is located completely within the first endcap 56. In some embodiments, the entire labyrinth arrangement 74 is located within the housing 40. In other arrangements, the majority of the labyrinth arrangement 74 is located on the housing 40, and the first endcap 56 provides a closing wall for the labyrinth arrangement 74. In such an arrangement, the roles of the first endcap 56 and the housing 40 with respect to the labyrinth arrangement 74 are reversed compared to the arrangement described in FIG. 1.

The labyrinth arrangement 74 can be a variety of geometric configurations. In reference now to FIGS. 4-6, the labyrinth arrangement 74 comprises a labyrinth wall 80 that is part of the first end cap 56 and forms a path, preferably a tortuous path 82 between the first port 48 and an end location 84, which is in airflow communication with the labyrinth aperture 76 (FIGS. 1 and 2). In the embodiment shown, the end location 84 is centered within the first end cap 56, but it should be understood that the end location 84 can be in other locations or in a plurality of locations. In the particular embodiment illustrated in FIGS. 4 and 5, the labyrinth wall 80 forms a spiral channel 86 between the first port 48 and the end location 84. Air that travels between the first port 48 and the end location 84 will be forced to travel within the airflow path 82 between the labyrinth wall 80 and through the spiral channel 86. This labyrinth arrangement 74 creates a longer flowpath, as compared to a system without a labyrinth arrangement 74, thereby slowing down the rate which moisture in the airflow reaches the adsorbent material 46 in the interior volume 44 of the filter 20. Under static conditions when the fluid 24 in the tank 22 is not being utilized by equipment, but there are humid conditions that are causing airflow to be drawn into the breather filter 20, the labyrinth arrangement 74 will slow down the rate which the moisture reaches the adsorbent material 46, and the labyrinth arrangement 74 will resist the diffusion of humid air as the humid air attempts to reach the adsorbent material 46. This will typically increase the life of the adsorbent material 46 relative to a filter that does not have a labyrinth arrangement.

In preferred arrangements, the labyrinth arrangement 74 will have:
- an L/D ratio of at least 50, in which L is a length of the spiral channel 86;
- D is an equivalent channel diameter and is calculated by taking the square root of (4/pi ×A); and
- A=channel width×the channel height.

It has been found that the L/D ratio is preferably no greater than 380 and preferably the L/D ratio should be at about 150, assuming a maximum flow of 100 lpm (3.5 cfm) and a max pressure drop of 0.5 psid. The L/D ratio in these ranges will allow for the life of the adsorbent material 46 to be increased sufficiently without an excessive increase in the restriction of airflow between the headspace the atmosphere.

Figure 12:
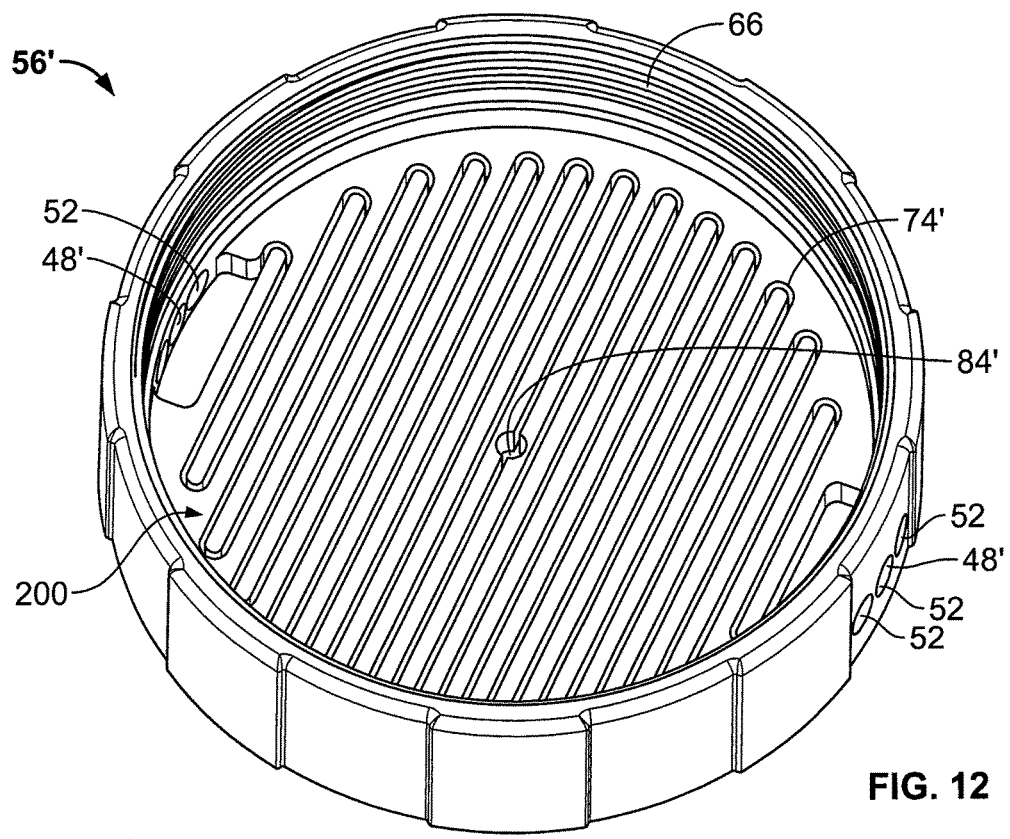
FIG. 12 is a top, perspective view of an alternative embodiment of an end cap of a housing of the breather filter of FIGS. 1 and 2.
Figure 13:
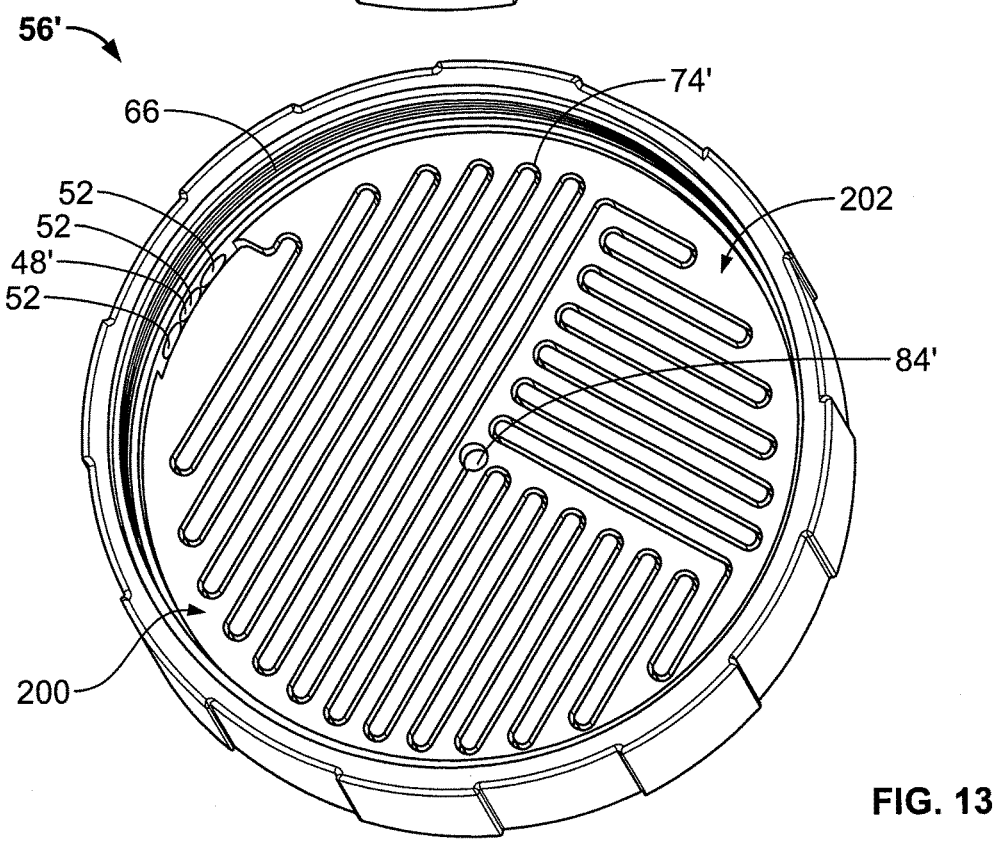
FIG. 13 is a top, perspective view of an alternative embodiment of an end cap of a housing of the breather filter of FIGS. 1 and 2.
Figure 14:
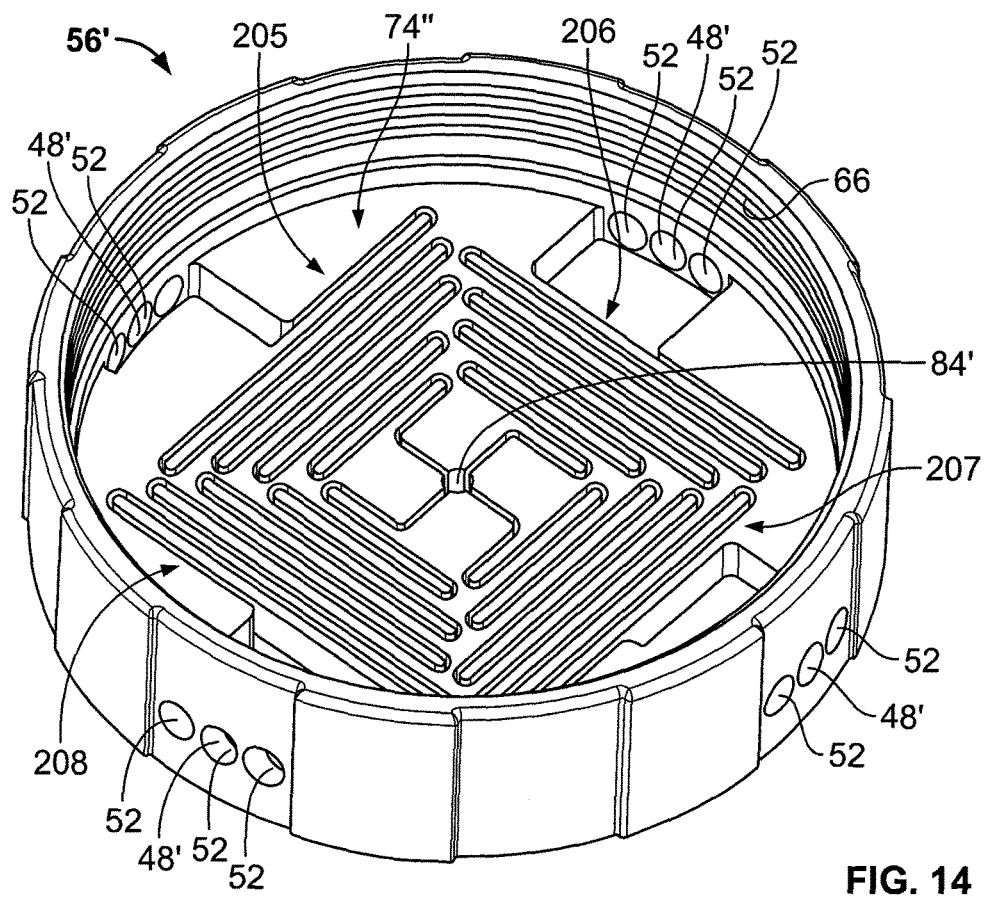
FIG. 14 is a top, perspective view of an alternative embodiment of an end cap of a housing of the breather filter of FIGS. 1 and 2.

FIGS. 12-14 show embodiments of first end cap 56' including different embodiments of labyrinth arrangement 74. In FIG. 12, the labyrinth arrangement 74' includes several parallel channels connected together by curved ends in a switchback arrangement 200. The switchback arrangement 200 can also include one or more sections that are angled relative to the other sections, such as FIG. 13 (one quartile 202 is angled, in this case orthogonally) to the remaining section of the end cap 56. In FIG. 14, the labyrinth arrangement 74" includes are four quartiles 205, 206, 207, 208, each angled relative to the next adjacent quartile. In FIG. 12, there is a first port 48' on opposite sides of the end cap 56', while in FIG. 13, there is only the single location of first port 48'. In FIG. 14, there are 4 first ports 48' along the outer perimeter of the first end cap 56, evenly spaced, about every 90 degrees, each one being in communication with one of the quartiles 205-208. In each of FIGS. 12-14, the labyrinth arrangement 74', 74" is in communication with end location 84', which is in airflow communication with the labyrinth aperture 76.

Now in reference to FIGS. 8-11, in this embodiment, the housing 40 further includes a second end cap 90. The second end cap 90 is typically removably attachable to the housing body 58 and at an end of the housing body 58 opposite from where the first end cap 56 is attached. The second end cap 90 is removably attachable to the housing body 58 through threads 92 along an inner surface 94 of a surrounding wall 96. The second end cap 90, in this embodiment, defines the second port 54. In some embodiments, no second end cap 90 is used, and the housing 40 is coupled directly to the tank 22.

In preferred arrangements, the second end cap 90 is constructed and arranged to help direct liquid flow into the tank 22. In the embodiment shown in FIG. 11, a funnel surface 98 is formed by having a sloped wall 100 directed between the surrounding wall 96 and a neck 102 surrounding and defining the second port 54.

Figure 9:
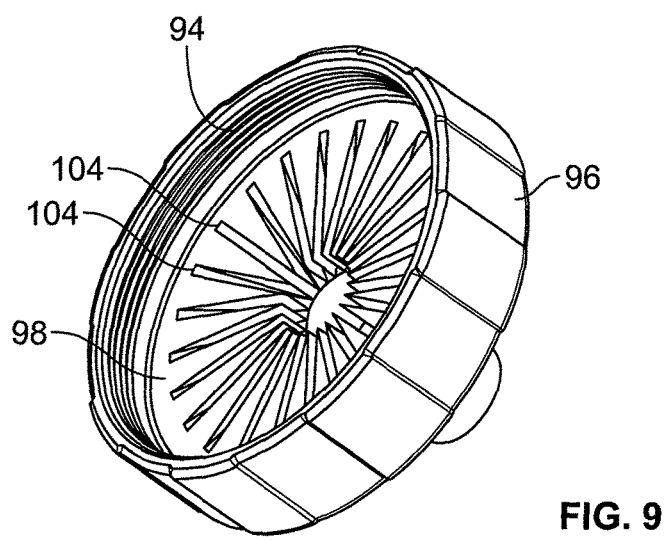
FIG. 9 is another perspective view of the end cap of FIG. 8.
Figure 10:
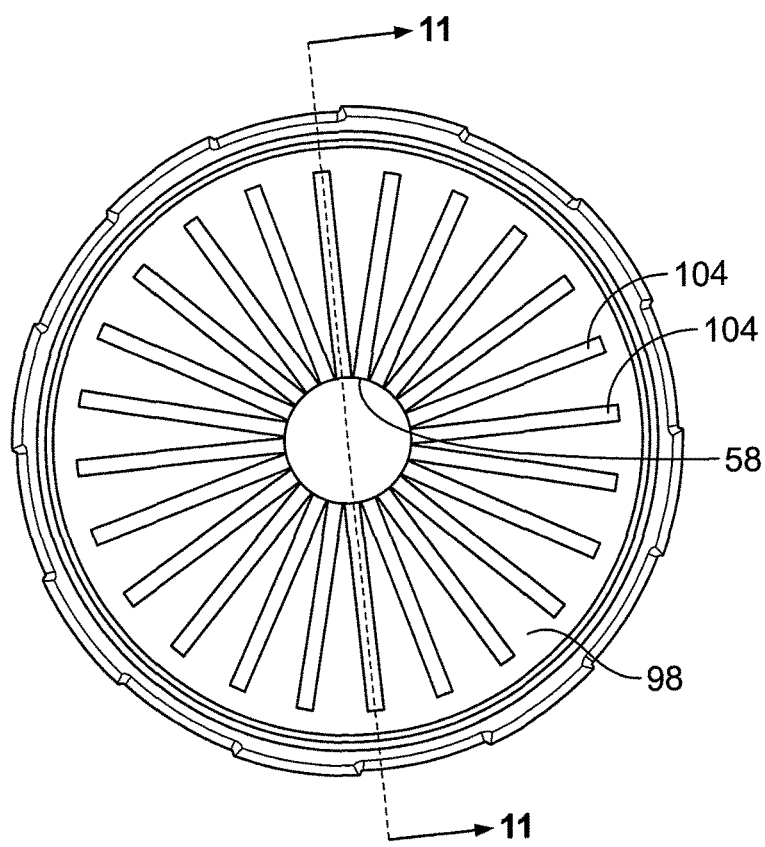
FIG. 10 is a top view of the end cap of FIG. 9.
Figure 11:
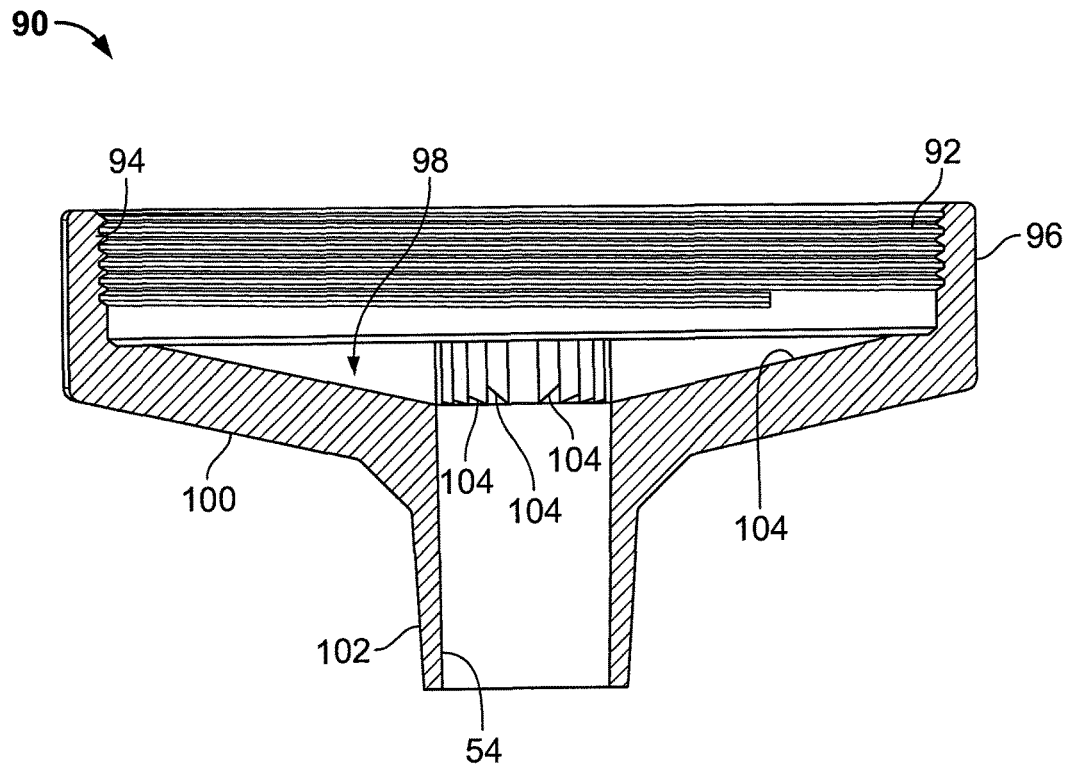
FIG. 11 is a cross-sectional view of the end cap of FIGS. 8-10, the cross-section being taken along the line 11-11 of FIG. 10.

Optionally, as can be seen in FIGS. 9 and 10, the second end cap 90 includes a plurality of ribs 104 projecting or extending from the funnel surface 98. The ribs 104 extend radially between the second port 54 and the surrounding wall 96. The ribs 104 help to form channels therebetween to direct coalesced liquid into the tank 22. Of course, a variety of implementations are possible.

As can be seen in FIGS. 1 and 2, there is a seal member 106 between the second end cap 90 and the housing body 58. The seal member 106 forms a seal 108 between the inner surface 94 of the second end cap 90 and the outer wall 42 of the housing body 58, when the second end cap 90 is threaded in connection to the housing body 58. In the embodiment shown, the seal member 106 is an O-ring 110. Other arrangements and seal members can be used.

In reference again to FIGS. 1 and 2, the breather filter 20 includes a plurality of adsorbent materials 46, including at least a first adsorbent material 120 and at least a second adsorbent material 122 within the housing 40. The second adsorbent material 122 is "different" from the first adsorbent material 120 and is layered adjacent to the first adsorbent material 120. By "different", it is meant that the adsorptive material have different specific surface areas, chemical formulae, sizes, densities, packabilities (how well the particles fit together), and/or abilities to adsorb moisture. Thus, in some embodiments, the first adsorptive material has a different chemical composition from the second adsorptive material. In other embodiments, particles of first adsorptive material have an average specific surface area different from the average specific surface area of particles of the second adsorptive material. The first adsorbent material 120 and the second adsorbent material 122 are frequently arranged within the housing 40 so that fluid or air travels between the first port 48 and second port 54 by passing through each of the first adsorbent material 120 and second adsorbent material 122. In addition, in preferred arrangements, the first adsorbent material 120 is arranged relative to the labyrinth arrangement 74 such that fluid or air cannot travel between the first port 48 and the first adsorbent material 120 without passing through the labyrinth arrangement 74.

In the arrangement illustrated in FIGS. 1 and 2, the first adsorbent material 120 is between the labyrinth arrangement 74 and the second adsorbent material 122. As can be seen in the FIGS., the second adsorbent material 122, in the particular embodiment shown, is between the first adsorbent material 120 and the second port 54.

In preferred arrangements, the adsorbent material that is more closely located to the first port 48 has a higher capacity of adsorption at a high relative humidity than the other adsorbent material. In this arrangement, it is the first adsorbent material 120 that has a higher capacity of adsorption than the second adsorbent material 122. In this type of arrangement, the first adsorbent material 120 has a "better performance" at higher levels of humidity than the second adsorbent material 122, which performs better at lower humidity. By "better performance", it is meant that the first material 120 will adsorb a greater amount of moisture at a higher relative humidity than the second material 122 will adsorb; and, the second material 122 will adsorb a greater amount of moisture at a lower relative humidity than the first material 120 will adsorb. The first adsorbent material 120 has a capacity of adsorption tuned to higher relative humidities than the second adsorbent material 122. Stated another way, the first adsorbent material 120 and the second adsorbent material have different "moisture sorption isotherms". In this context, "moisture sorption isotherms" refers to the water vapor capacity of a sorbent (activated carbon, zeolite, etc.) at various water vapor concentrations (percent relative humidity). The measurements were performed at one temperature (isothermal) and plotted as capacity (percent weight) vs. water vapor concentration (percent relative humidity "rh").

While in the embodiment shown, there are two different layers of adsorbent material 120, 122, it should be understood that in embodiments using the diffusion channel 34, a sole or single layer could be used; alternatively, more than two layers of other adsorbent materials or the same materials but arranged layered with different ones in between, could be used. In embodiments that do not use the diffusion channel 34, at least two or more different layers of adsorbent material 120, 122 are used. When at least two layers of adsorbent material 120, 122 are used, there is synergy between the layers. For example, the first layer 120 is adapted to adsorb a greater amount of moisture at a higher relative humidity than the second layer 122 will adsorb; and, the second layer 122 is adapted to adsorb a greater amount of moisture at a lower relative humidity than the first layer 120 will adsorb. Accordingly, for example, a 2 inch depth comprising the first and second layers 120, 122 as described herein will remove more moisture than a 2 inch depth of either of the first layer 120 or the second layer 122 alone would remove.

In one embodiment, the first adsorbent material 120 comprises activated carbon or a blend thereof. The second adsorbent material 122 may comprise a silica gel material and is a material that changes in color in response to a predetermined level of adsorption. When the second adsorbent material 122 changes color, this can provide a visual indication to a user that the breather filter 20 needs to be serviced or replaced. The housing 40, in this example, can be partially or entirely transparent. For example, the housing 40 may comprise transparent PVC or polycarbonate.

In one example embodiment, the second adsorbent material 122 comprises silica gel or a blend thereof. Instead of silica gel or mixed with silica gel there can include calcium sulfate and/or zeolites.

In the embodiment shown, the breather filter 20 includes no more than the first adsorbent material 120 and the second adsorbent material 122. In one example, the first adsorbent material 122 consists essentially of an activated carbon or consists essentially of a layer of activated carbon and a color changing agent. In one example, the second adsorbent material 122 consists essentially of silica gel or consists essentially of silica gel and a color changing agent. An example of a color changing agent includes cobalt chloride used in DelSORB AB25B® from DELTA ADSORBENTS.

In review of FIGS. 1 and 2, it should be appreciated that the labyrinth aperture 76 in the plate 78 is in fluid communication with the first adsorbent material 120.

A variety of implementations are possible. In the particular embodiment shown in FIGS. 1 and 2, the first adsorbent material 120 and the second adsorbent material 122 are separated by a porous scrim 124, which could also be a porous plate, or a porous plate layered with one or more scrims. The scrim 124 typically separates the layers of adsorbents, and the plates provide structural support to the scrim 124. The scrim 124 or plate may have O-ring seal members 126, 128 to help seal and hold the scrim 124 or plate in place within the housing 40.

In this particular arrangement, between the second adsorbent material 122 and the second port 54 is expansion foam 130. The foam 130 helps to prevent the adsorbent materials 120, 122 from movement within the housing 40, and it also helps to contain the adsorbent material 46 within the housing 40. Between the second adsorbent material 122 and the foam 130 is a plate or scrim 132 that is shown in this embodiment as being held in place with first and second O-rings 134, 136 along the top and bottom of the plate or scrim 132. The scrim 132 can also function as a filter.

In FIG. 1, grooves 138, 139 can be seen along the inner surface 43 of the housing 40. These grooves 138, 139 allow for alternate locations for holding O-rings and plates or scrim, to allow for flexibility of how much and what proportion of first adsorbent material 120 and second adsorbent material 122 to utilize.

In FIG. 1, it should be noted that the first adsorbent material 120, second adsorbent material 122, and the foam 130 are shown schematically, with only a portion being illustrated. It should be realized that these materials would occupy the entire volume in the indicated space within the interior volume 44 of the housing 40. That is, in the embodiment of FIG. 1, the first adsorbent material 120 occupies the entire volume between the plate 78 and the scrim or plate 124. The second adsorbent material 122 occupies the entire volume between the scrim or plate 124 and the plate or scrim 132. In a preferred arrangement, air or fluid typically does not have a path between the first port 48 and second port 54 without passing through both the first adsorbent material 120 and second adsorbent material 122. In a preferred arrangement, air or fluid typically flows between the first port 48 and second port 54 by passing through both the first adsorbent material 120 and second adsorbent material 122.

In some preferred systems, the upper bound for the pressure differential caused by flow through the labyrinth arrangement 74 will be not greater than 0.5 psid for both ingression and egression. Preferably, in ideal conditions, the breather filter 20 will operate below 0.5 psi, which equates to about 13.8 inches of water, and more preferably, less than 7 inches of water of pressure differential. In one embodiment, the path of the spiral channel 86 will have a channel width of 8 mm, with a depth of 5 mm and a length of about 128 cm. In this type of geometry, the pressure differential will be 0.164 inches of water at 0.5 lpm. In one example, assuming the maximum flow of 100 lpm (3.5 cfm) and maximum pressure differential of 0.5 psid, then the minimum L/D ratio of 50 includes a relative humidity (RH) rising to 50% of final in 160 hours. An L/D ratio of about 150 has an RH rising to 50% of final in 500 hours. A maximum L/D ratio of 380 has the pressure differential at its limit, and the RH rises to 50% of final in greater than 1,000 hours.

In other words, in typical environments for this application, the outside atmosphere 50 has a higher relative humidity than the protected enclosure in the interior 44 of the breather filter 20. Over time, the moisture from the outside atmosphere 50 diffuses into the interior volume 44 of the filter 20, and the humidity within the filter 20 increases until relative humidity between the interior volume 44 and outside atmosphere 50 are equal. The longer and narrower the channel 86 is (resulting in a higher L/D ratio), the longer this equalization takes, which lengthens the life of the filter 20. The penalty for a large L/D ratio is a high pressure drop when air is forced through the channel. A lower pressure drop is desirable, in many situations, so in many applications, a workable solution is balance the desirable qualities of having a lengthened life of the adsorbent 46 by having a large L/D ratio, while without causing too much pressure drop when flow is required by having a small L/D. As summarized above, preferable solutions include having an L/D ratio of at least 50, no greater than 380, and preferably at about 150.

Example Methods

The above construction or variations of it can be used in a method for controlling humidity of a liquid tank headspace. For example, the headspace 28 of the tank 22, or container, can have its humidity controlled by breather filter 20. The method includes providing the fluid tank 22 having a liquid 24, such as hydraulic fluid or oil, therein and headspace 28 between the fluid 22 and wall 30 of the tank 22. The breather filter 20 is in fluid communication with the headspace 28 of the tank 22. The method includes when liquid 24 in the tank 22 drops, drawing air into the breather filter 20 and through the labyrinth arrangement 74, then through the first adsorbent material 120, then through the second adsorbent material 122, and then from the breather filter 20 and into the headspace 28 of the tank 22. The labyrinth arrangement 74 helps to coalesce any moisture in the atmosphere 50 before it reaches the first adsorbent material 120. The labyrinth arrangement 74 creates a long diffusion path length, acting as a barrier to any moisture reaching the first adsorbent material 120 under quiescent conditions. Air that does reach the first adsorbent material 120 and second adsorbent material 122 has any further moisture adsorbed by the adsorbent materials 120, 122.

The method also includes, when the liquid 24 in the tank 22 rises, directing the liquid from the headspace 28 and into the breather filter 20. The liquid 24 in the headspace 28 can be air, gas, or a mist. From the headspace 28, the air, gas, or mist is directed through the second adsorbent material 122, then through the first adsorbent material 120, then through the labyrinth arrangement 74, and then out of the breather filter 20 to the atmosphere 50. In some arrangements, before being directed through the second adsorbent material 122, the fluid may be directed through foam 130, which helps to coalesce any oil mist into droplets that is then drained out of the breather filter 20 through the second port 54.

The step of drawing air into the breather filter 20 includes drawing the air through the labyrinth arrangement 74, which includes a wall in the first end cap 56 of the housing 40 for the breather filter 20, and in example embodiments, the wall 80 of the labyrinth arrangement 74 forms spiral channel 86.

In one example embodiment, the color of the second adsorbent material 122 is monitored, and when it changes color, the breather filter 20 is serviced. The breather filter 20 may be serviced by removing it from the tank 22 and replacing it with a new breather filter. In some embodiments, the breather filter 120 is serviced by removing it from the tank and then detaching the end caps 56, 90 from the housing body 58 and replacing the internal adsorbent material 46 and foam 130. The first adsorbent material 120 and second adsorbent material 122 may be replaced with new, fresh adsorbent material, or it may be recharged by drawing and removing the moisture.

In one method of use, if the fluid 24 in the tank 22 is not being utilized by equipment, there still may be a draw of air from the atmosphere 50 into the breather filter 20 due to humid conditions. In this method, the air is drawn in through the first port 48 and then along the path 82 created by the labyrinth wall 80. This path 82 will slow down the rate that moisture reaches the first adsorbent material 120, as compared to a breather filter that it did not have the labyrinth arrangement 74 between the first port 48 and the first adsorbent material 120.

Experimental

Testing was done in two phases. Initial work was performed on the VTI Vapor Sorption Analyzer ('VTI') with later work taking place on a custom built breakthrough test bench.

Analysis & Discussion

Isotherms

WV-B1500, an activated carbon from MeadWestVaco, had the highest capacity, absorbing almost 130% of its own weight in water, with half of the capacity existing at higher than 70%. However, the material has nearly no performance at the low end of the humidity scale.

Silica gel offers reasonable performance at the low and medium humidity ranges, but lacks capacity at the high end. The silica gel tested managed to reach 35 wt % pickup as a maximum. It should also be noted that the silica gel reaches half its maximum capacity at the value of 35% rh.

Zeolite 4A reaches half capacity at 5% rh. Reaching half capacity at such a low humidity level means that it offers only minimal capacity increases at humidity levels greater than 20% rh.

Briefly summarized:

|  | Tight Liquid Req | Regular Liquid Req | Loose Liq Req |
|---|---|---|---|
| Low Air Humidity (<20% rh) | All zeolite based sorbent | All silica gel based sorbent | Any sorbent package |
| Mild Air Humidity (20-60% rh) | Zeolite and silica gel sorbent | Activated carbon and silica gel sorbent | All silica gel based sorbent |
| High Air Humidity (>60% rh) | Active system required | Activated carbon and silica gel sorbent | Activated carbon and silica gel sorbent |

Alternate Embodiments, FIGS. 15-20

Figure 15:
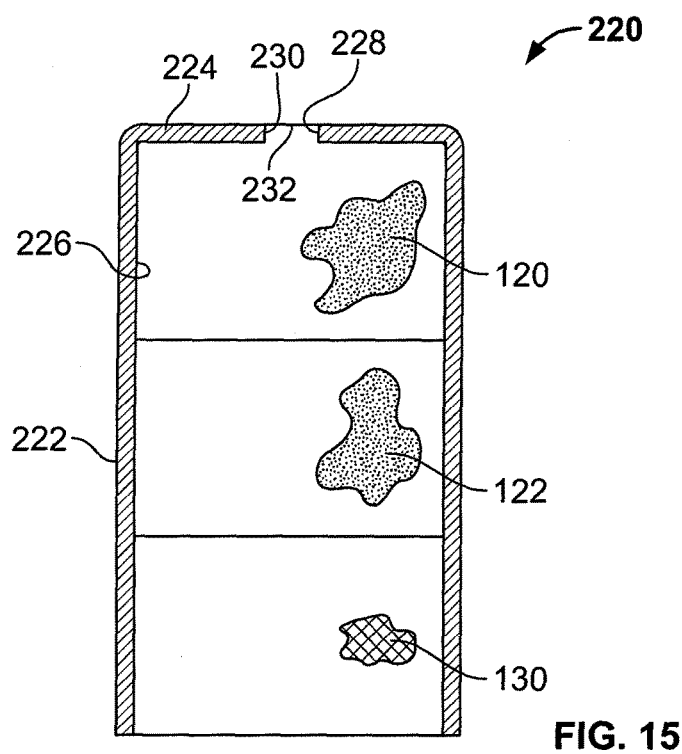
FIG. 15 is a schematic, side view of the example filter cartridge constructed in accordance with principles of this disclosure.

In FIG. 15, a filter cartridge 220 is schematically illustrated in cross-section. The filter cartridge 220 can be used in a filter assembly, such as the assembly shown by breather filter 20.

The filter cartridge 20 is removable and replaceable in the breather filter assembly 20. For example, the cartridge 220 can be mounted between the first end cap 56 and the second end cap 90.

The cartridge 220 includes a cartridge shell 222 and a top cover 224. In one example embodiment, the shell 22 and cover 24 are molded from the same construction, and are a single piece of molded material. In other embodiments, the shell 22 and cover 24 may be separate pieces of material and fixed together.

The shell 222 defines a cartridge interior 226. The cartridge interior 226 includes at least first adsorbent material 120 and at least second adsorbent 122. The second adsorbent 122 is layered in series with the first adsorbent 120. The second adsorbent 122 has a characteristic different from the first adsorbent 120, as previously discussed in connection with the earlier embodiments.

The top cover 24 includes a gas opening 228. The gas opening 228 is defined by a boundary 230. In the example shown in FIG. 15, the gas opening 228 is centered on the top cover 224. In other embodiments, the gas opening 228 can be in locations different than the center of the top cover 224. The boundary 230 can be a penetrable boundary 230.

The first adsorbent material 120 and the second adsorbent material 122 are arranged within the cartridge interior 226 so that gas travels through the cartridge 220 by passing through the gas opening 228 and then through each of the first adsorbent material 120 and second adsorbent material 122.

In the example embodiment shown in FIG. 15, the cartridge 220 can also include a foam layer 130, as described in connection with the previous embodiments.

Still in reference to FIG. 15, in the embodiment shown, a penetrable film 232 is shown covering the gas opening 228. This film 232 is to contain the contents of the cartridge interior 226, when the cartridge 220 is not in use installed on a filter assembly. The film 232 will prevent, for example, the first adsorbent material 120 from spilling out through the gas opening 228.

The film 232 is penetrable in that, when installed in use in a filter assembly, the user can easily remove the film 232 to expose the gas opening 228. In addition, this removal of the film 232 can be done through engagement with the first end cap 234 (FIG. 16), to be discussed further below.

Figure 19:
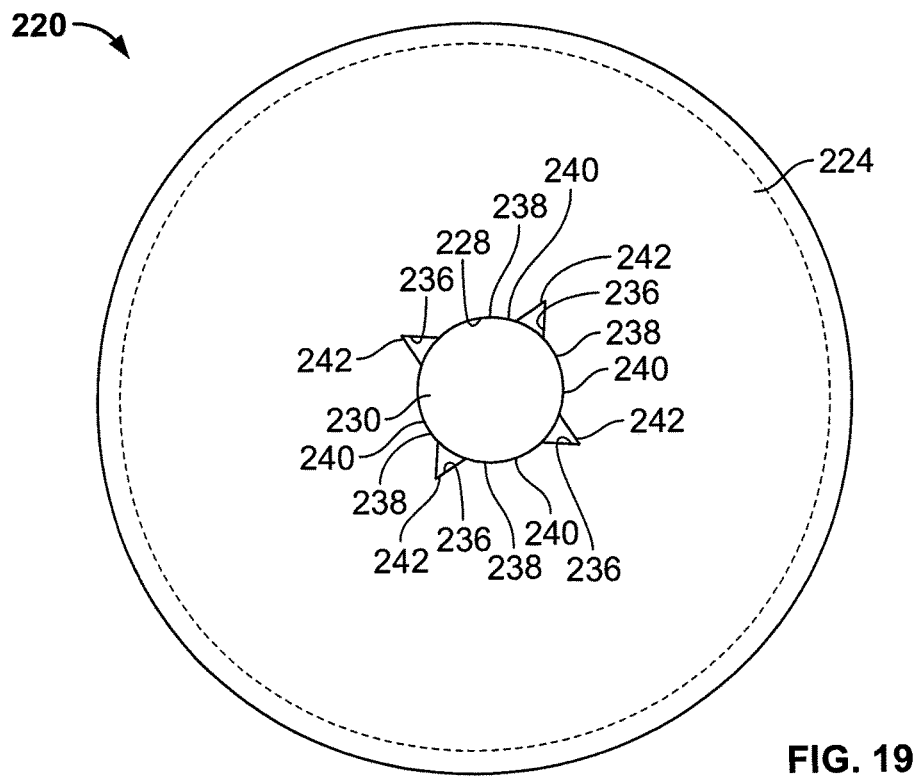
FIG. 19 is an end view of the filter cartridge of FIG. 15.

In reference now to FIG. 19, in cross-section viewed in a direction perpendicular to a direction in which the first and second adsorbent materials 120, 122 are arranged, along the gas opening boundary 230 of the top cover 224 is a plurality of alternating recesses 236 and segments 238. A variety of shapes can be used. In the embodiment illustrated, the alternating segments 238 are arched segments 240. The recesses 236 are illustrated as being generally triangle shaped 242.

As with the previous embodiments, the second adsorbent material 122 has a characteristic different from the first adsorbent material 120. This characteristic can include at least one of particle size, adsorbent capacity, and/or specific surface area. Further, as with the previous embodiments, the first adsorbent material 120 adsorbs a greater amount of moisture at a higher relative humidity than the second adsorbent material 122.

As with the previous embodiments, the second adsorbent material 122 can change in color in response to a predetermined level of adsorption. It can be helpful to have the shell 222 be made from a clear or transparent material so that color change can be visually detected.

Figure 16:
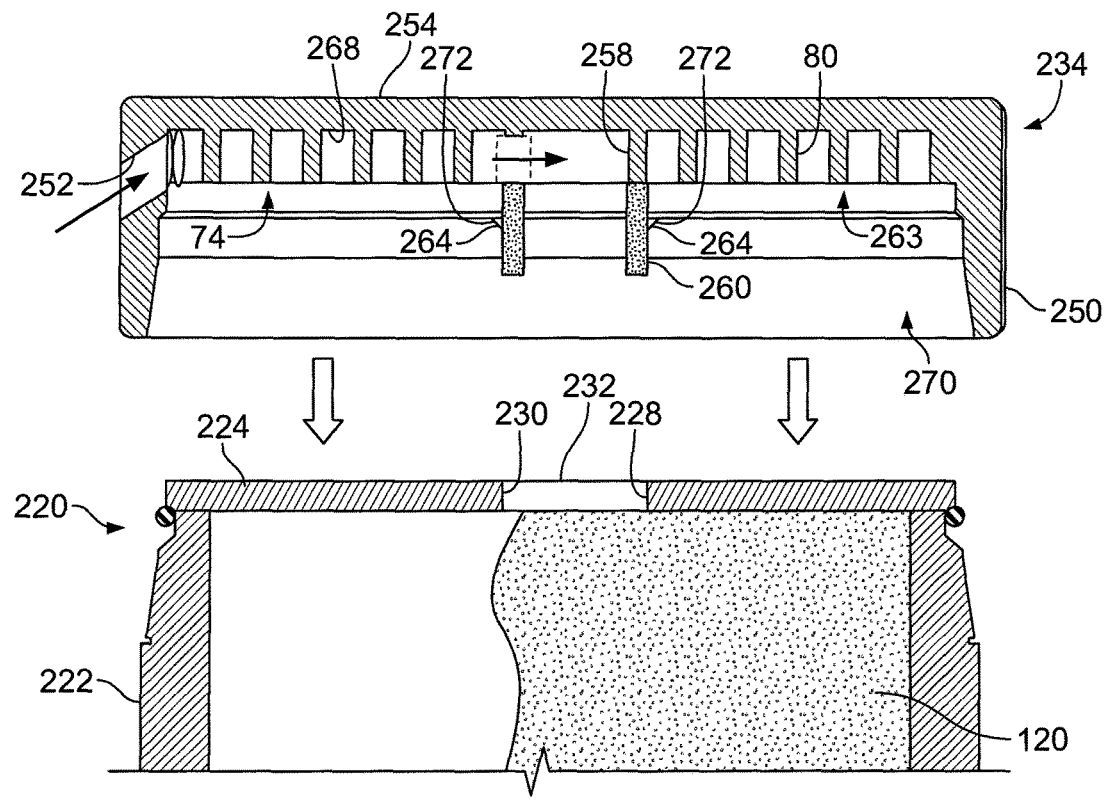
FIG. 16 is a schematic cross-sectional view depicting a portion of the filter cartridge of FIG. 15 and a first end cap of the breather filter of FIG. 1.
Figure 17:
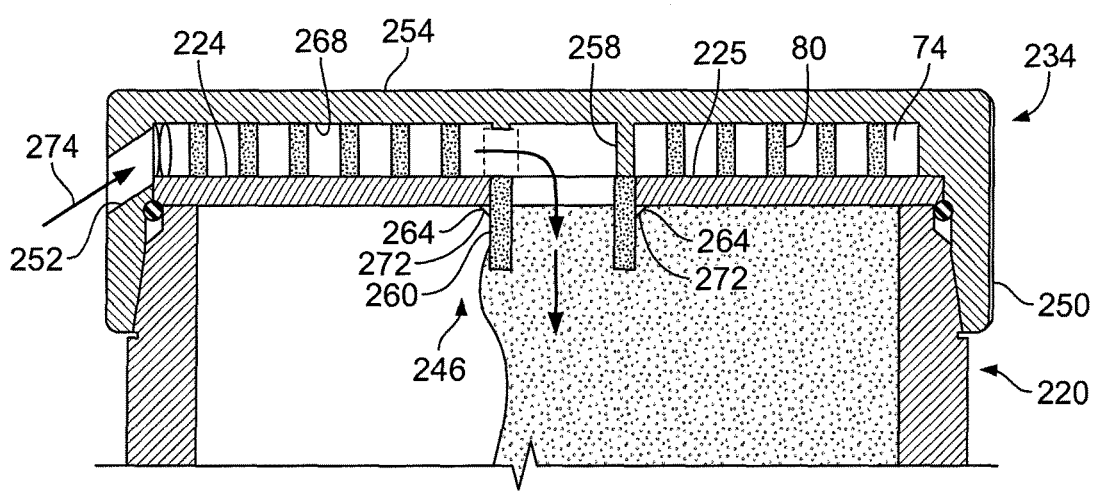
FIG. 17 is a schematic, cross-sectional view showing the end cap and filter cartridge of FIG. 16 operably engaged and connected to each other.
Figure 18:
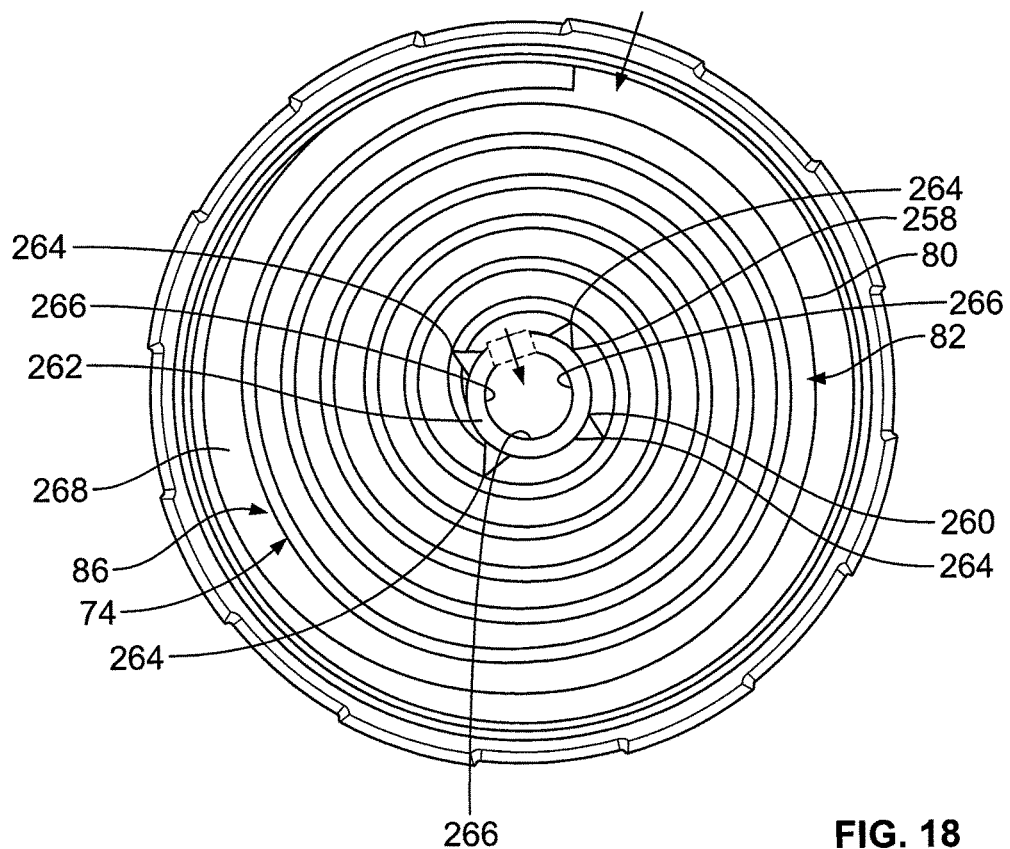
FIG. 18 is an end view of the inside surface of the end cap of FIG. 16.

In reference now to FIGS. 16-18, the first end cap 234 is illustrated. The first end cap 234 is analogous to the first end cap 56, described previously, and which description is incorporated herein by reference. One difference between the end cap 56 and the end cap 234 is that there is no threaded connection for the end cap 234. Rather, the end cap 234 removably attaches to the filter cartridge 220. There are many ways to removably attach the filter cartridge 220 to the end cap 234. In the example shown, there is a snap fit connection 246 (FIG. 17) between an aperture border 260 in the end cap 234 and the gas opening 228 of the cartridge 220.

In the example shown in FIG. 16, the first end cap 234 includes an outer wall 250 defining a first port 252. The first end cap 234 also includes an end wall 254.

As with the previous embodiments, the first end cap 234, in this embodiment, includes labyrinth arrangement 74. The labyrinth arrangement 74 is within the outer wall 250 and is closed on one side by the end wall 254. As with the previous embodiment, the labyrinth arrangement 74 is structure that forms an air flow path that is non-linear and maze-like. The labyrinth arrangement 74 includes labyrinth wall 80 that forms tortuous path 82 between the port 252 and an aperture 258.

The aperture 258 has a border 260 defined by a labyrinth wall 262. The aperture border 260 has a height that is greater than a height of the labyrinth arrangement 74.

In the example embodiment shown, the aperture border 260 includes a plurality of spaced projections 264. Spaced between the projections 264 are segments 266, and in the example shown, the segments 266 are arched shaped.

The tortuous path 82, formed by the labyrinth arrangement 74 forms a gas flow channel 268 flowing between the labyrinth wall 262. From a review of FIG. 16, it can be seen how the channel 268 is closed by the closed top end wall 254 of the first end cap 234, while it has an open side 263 opposite of the closed top end 254. The open side 263 of the channel 268 will be closed when the end cap 234 is operably connected to the cartridge 220.

The first end cap 234 includes a bottom end 270 that is open and in communication with the channel 268 formed by the labyrinth arrangement 74. The open bottom end 270 can receive the cartridge 220 there within.

As with the previous embodiments, the labyrinth wall 262 can be in the shape of a spiral channel 86 between the port 252 and the aperture 258. Certain preferred relationships between the length of the spiral channel 86 and the equivalent channel diameter may be as previously characterized, in which a ratio of L/D is at least 50, and A is equal to the channel width taken times the channel height, and the equivalent channel diameter D is equal to the square root of $(4/\pi iA)$. In some embodiments, the L/D ratio is no greater than 380. In some embodiments, the L/D ratio is about 150.

FIG. 16 illustrates the first end cap 234 and the filter cartridge 220 before they are releasably attached together. FIG. 17 illustrates the first end cap 234 and the filter cartridge 220 connected together. In FIG. 17, it can be seen how the aperture border 260 including the projections 264 snap within the gas opening 228 of the top cover 224 of the cartridge 220 to form snap connection 246.

In the example shown, the projections 264 are received within the recesses 236 of the gas opening 228, while the arched segments 266 are adjacent to the arched segments 240 of the gas opening 228.

The projections 264 can include a deflectable lip 272 that deflects and snaps in engagement with the gas opening boundary 230 of the cartridge 220. This snap engagement will releasably connect to the first end cap 234 to the cartridge 220.

After the first end cap 234 is attached to the cartridge 220, the exterior surface 225 of the top cover 224 closes the open side 263 of the labyrinth 74. In this way, the air that enters the port 252 flows through the channel 268, which is closed on the upper end by end wall 254, and at the open side 263 by the exterior surface 225 of the top cover 224.

One example air flow path is shown in FIG. 17. Gas can be seen entering the port 252 at arrow 274. The gas then flows through the labyrinth arrangement 74 by flowing within the channel 268 and through the tortuous path 82. The gas then emerges from the channel 268 of the labyrinth arrangement 74 through the aperture 258. The gas then flows through the aperture 258 and into the cartridge 220 through the gas opening 228, which is releasably attached to the first end cap 234. From there, the gas flows through the first adsorbent 120 and second adsorbent 122.

Figure 20:
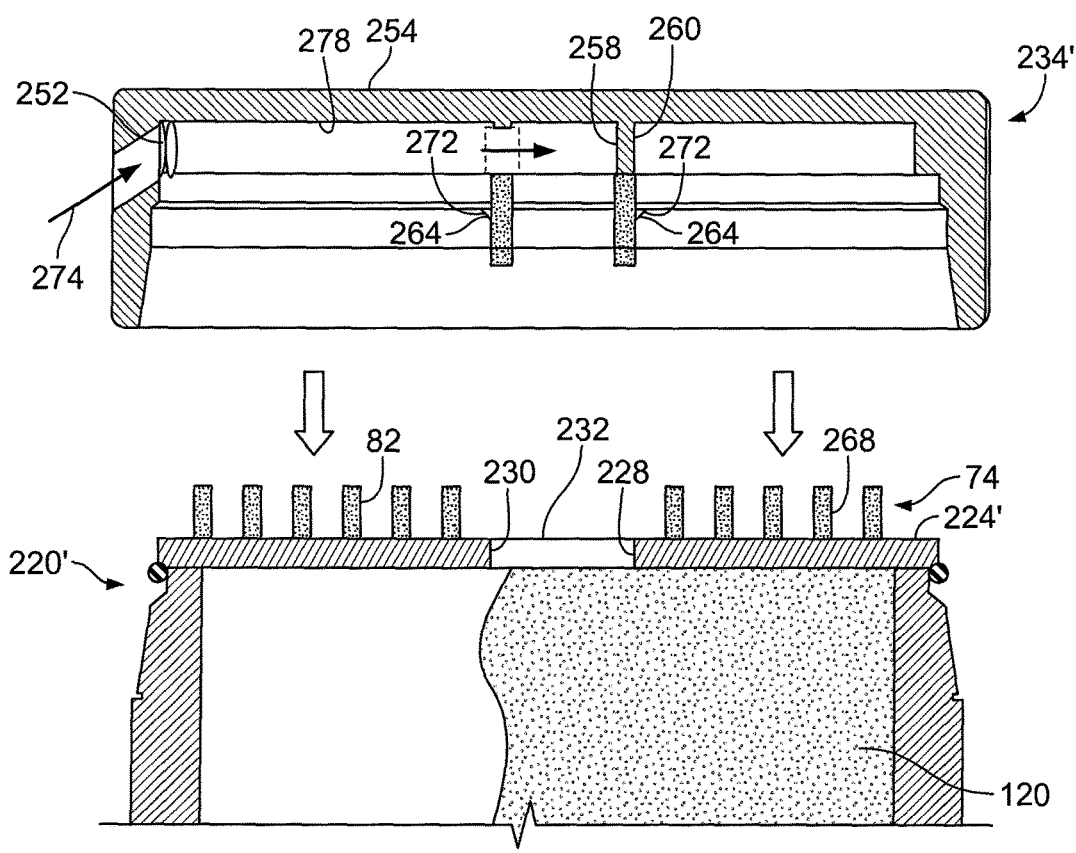
FIG. 20 is a cross-sectional view, similar to the view of FIG. 16, but showing an alternate embodiment of an end cap and filter cartridge portion.

FIG. 20 illustrates an alternate embodiment of the cartridge, illustrated at 220' and of the first end cap, illustrated at 234'. In this embodiment, the filter cartridge 220' includes labyrinth arrangement 74 connected to the top cover 224'. For example, the labyrinth arrangement 74 can be molded as the same piece as the top cover 224'. Alternatively, the labyrinth arrangement 74 can be mechanically fixed to the top cover 224 of the cartridge 220'. Other than the location of the labyrinth arrangement 74, the cartridge 220' is the same as the cartridge 220 of FIG. 15.

The first end cap 234' is the same as the first end cap 234, with the exception that there is no labyrinth arrangement 74 in the first end cap 234'.

In use, the first end cap 234' is mounted over the cartridge 220'. There is engagement between the boundary 230 of the gas opening 228 in the cartridge 220' and the aperture border 260 of the first end cap 234'. When the first end cap 234 is operably mounted onto the cartridge 220', the inner wall surface 278 of the end wall 254 closes the top open channel 268 of the labyrinth 74. This then results in the gas flow flowing through the port 252 at arrow 274 and then through tortuous path 82 created by the labyrinth 74 that is closed on the top by the inner wall surface 278 of the end wall 254 and at the bottom by the top cover 224'. The gas exits the labyrinth 74 at the aperture 258 and then flows into the cartridge 220 through the gas opening 228, and then through the first and second adsorbent materials 120, 122.

The above represents principles and examples. Many arrangements are possible.

What is claimed is:

1. A filter for use with a moisture sensitive container; the filter comprising:
   (a) a housing assembly having a first port and a second port and a first end cap;
   (b) at least a first adsorbent material within the housing;
   (c) at least a second adsorbent material within the housing assembly and layered in series with the first adsorbent material; the second adsorbent material having a characteristic different from the first adsorbent material;
      (i) the first adsorbent material and the second adsorbent material arranged within the housing assembly so that gas travels between the first port and second port by passing through each of the first adsorbent material and the second adsorbent material; and
   (d) a labyrinth arrangement in fluid communication with the first port and being between the first port and the first adsorbent material; the labyrinth arrangement being located such that gas travels between the first port and the first adsorbent material by flowing through the labyrinth arrangement and wherein
      (i) the labyrinth arrangement comprises a wall in the first end cap forming a tortuous path between the first port to the first adsorbent material; and
      (ii) the wall in the first end cap forms a spiral channel.

2. A filter according to claim 1 wherein:
   (a) the first adsorbent material is between the labyrinth arrangement and the second adsorbent material;
   (b) the second adsorbent material is between the first adsorbent material and the second port; and
   (c) the first adsorbent material adsorbs a greater amount of moisture at a first relative humidity than the second adsorbent material adsorbs at the first relative humidity.

3. A filter according to claim 2 wherein:
   (a) the second adsorbent material adsorbs a greater amount of moisture at a second relative humidity than the first adsorbent material adsorbs at the second relative humidity.

4. A filter according to claim 3 wherein:
   (a) the second adsorbent material changes in color in response to a predetermined level of adsorption.

5. A filter according to claim 3 wherein:
   (a) the first adsorbent material comprises a layer of activated carbon or a blend thereof; and
   (b) the second adsorbent material comprises a layer of silica gel or a blend thereof including calcium sulfate and zeolites.

6. A filter according to claim 3 wherein:
   (a) the second adsorbent material characteristic includes at least one of particle size, adsorbent capacity, and/or specific surface area.

7. A filter according to claim 3 wherein:
   (a) the first adsorbent material consists essentially of a layer of activated carbon or consists essentially of a layer of activated carbon and a color changing agent; and
   (b) the second adsorbent material consists essentially of a layer of silica gel or consists essentially of a layer of activated carbon and a color changing agent.

8. A filter according to claim 1 wherein:
   (a) the first end cap has the first port and an aperture in fluid communication between the labyrinth arrangement and the first adsorbent material.

9. A filter according to claim 8 wherein:
   (a) the labyrinth arrangement forms a channel between the first port and the aperture; and
   (b) an L/D ratio is at least 50, wherein L is a length of the channel and D is an equivalent channel diameter, in which:
      A=channel width×channel height; and
      D=square root of (4/pi×A).

10. A filter according to claim 9 wherein:
    (a) the L/D ratio is no greater than 380.

11. A filter according to claim 10 wherein:
    (a) the L/D ratio is about 150.

12. A filtration system for humidity control of a fluid tank headspace comprising:
    (a) a fluid tank configured to hold a liquid therein and a headspace between the liquid and a surface of the tank; and
    (b) a filter in fluid communication with the headspace of the tank; the filter including
       (i) a housing assembly having a first port in communication with atmosphere; and a second port in communication with the headspace of the fluid tank and a first end cap;
       (ii) at least a first adsorbent material within the housing assembly;
       (iii) at least a second adsorbent material within the housing assembly and layered in series with the first adsorbent material; the second adsorbent material having a characteristic different from the first adsorbent material;
          (A) the first adsorbent material and the second adsorbent material arranged within the housing assembly so that gas travels between the first port and second port by passing through each of the first adsorbent material and the second adsorbent material; and
       (iv) a labyrinth arrangement in fluid communication with the first port and being between the first port and the first adsorbent material; the labyrinth arrangement being located such that gas travels between the first port and the first adsorbent material by passing through the labyrinth arrangement; wherein the labyrinth arrangement comprises a wall in the first end cap forming a tortuous path between the first port to the first adsorbent material; and the wall in the first end cap forms a spiral channel;
    wherein, when liquid in the fluid tank drops, gas is drawn in through the first port, the labyrinth arrangement, the first adsorbent material, the second adsorbent material, and then through the second port to flow into the headspace of the fluid tank; and, when liquid in the tank rises, air is forced from the headspace, through the second port, the second adsorbent material, the first adsorbent material, the labyrinth arrangement, and then exits through the first port to the atmosphere.

13. A filtration system according to claim 12 wherein:
    (a) the first end cap has the first port and an aperture in fluid communication between the labyrinth arrangement and the first adsorbent material.

14. A filtration system according to claim 12 wherein:
    (a) the first adsorbent material is between the labyrinth arrangement and the second adsorbent material;
    (b) the second adsorbent material is between the first adsorbent material and the second port;
    (c) the first adsorbent material adsorbs a greater amount of moisture at a higher relative humidity than the second adsorbent material;

(d) the first adsorbent material comprises a layer of activated carbon or a blend thereof; and
(e) the second adsorbent material comprises a layer of silica gel or a blend thereof including calcium sulfate and zeolites.

15. A filtration system according to claim 12 wherein:
(a) the second adsorbent material characteristic includes at least one of particle size, adsorbent capacity, and/or specific surface area.

* * * * *